Patented May 2, 1950

2,505,816

UNITED STATES PATENT OFFICE 2,505,816

4,6-DI-TERTIARY-BUTYL-2-METHYLCYCLO-HEXANONE

Arthur C. Whitaker, Oakmont, Pa., and William W. Weinrich, Bartlesville, Okla., assignors to Gulf Research & Development Company, Pittsburgh, Pa., a corporation of Delaware No Drawing. Application May 28, 1945, Serial No. 596,416

2 Claims. (Cl. 260—586)

The present invention relates to the production of new compounds, and more particularly it relates to the production of hydrogenated polyalkylated phenols, namely, 4,6-di-tertiary-butyl-2-methylcyclohexanol and 4,6-di-tertiary-butyl-2-methylcyclohexanone, and to processes of producing these compounds.

The primary object of the present invention is to provide, as new compounds, hydrogenated polyalkylated phenols comprising 4,6-di-tertiary-butyl-2-methylcyclohexanol and 4,6-di-tertiary-butyl-2-methylcyclohexanone.

Another object of the present invention is to provide, as new compounds, 4,6-di-tertiary-butyl-2-methylcyclohexanol and 4,6-di-tertiary-butyl-2-methylcyclohexanone which are adapted to be utilized as chemical intermediates in the manufacture of plasticizers, pharmaceuticals, detergents, and antioxidants.

A further object of the present invention is to provide a method of hydrogenating 4,6-di-tertiary-butyl-2-methylphenol to convert said phenol into either 4,6-di-tertiary-butyl-2-methylcyclohexanone or to 4,6-di-tertiary-butyl-2-methylcyclohexanol.

These objects are attained in accordance with the present invention, in which 4,6-di-tertiary-butyl-2-methylphenol may be catalytically hydrogenated to convert it into 4,6-di-tertiary-butyl-2-methylcyclohexanol and into 4,6-di-tertiary-butyl-2-methylcyclohexanone. If the phenol is only partially hydrogenated, it is converted into the cyclic ketone, while if it is completely hydrogenated, the phenol is converted into the cyclic alcohol. By hydrogenating the phenol at a slightly higher temperature and higher initial hydrogen pressure and for a slightly longer time, it is possible to obtain the cyclic alcohol rather than the cyclic ketone.

In general, in practicing our invention for the production of 4,6-di-tertiary-butyl-2-methylcyclohexanol and 4,6-di-tertiary-butyl-2-methylcyclohexanone by the hydrogenation of 4,6-di-tertiary-butyl-2-methylphenol, we introduce a suitable amount of 4,6-di-tertiary-butyl-2-methylphenol and about 8 to 11 per cent, but preferably about 10 per cent, by weight, of a suitable hydrogenation catalyst, such as Raney or other form of nickel, platinum, or palladium, into a suitable pressure-resistant vessel, such as a rocking bomb, which is then closed and charged with hydrogen to the desired pressure of from about 1500 pounds per square inch of hydrogen to about 2500 pounds per square inch of hydrogen at the height of the reaction. Heat is then applied to the bomb, for example, electrically, and it is brought up to a reaction temperature of 150° C. to about 250° C. while agitating the reactants. From about one and one-half hours to about two hours are ordinarily required to heat the bomb and its contents to the temperatures specified. The bomb is continuously heated, after the initial reaction temperature has been obtained, for a period varying from about two hours for partial hydrogenation to about three and one-half hours for complete hydrogenation.

The completion of the reaction is indicated by a drop in the pressure of the bomb which is equivalent to three moles of hydrogen per mole of polyalkylphenol for complete hydrogenation and to two moles of hydrogen per mole of polyalkylphenol for partial hydrogenation.

The theoretical pressure drop was calculated as follows:

$$\Delta p = \frac{\text{wt. of sample} \times 82.06 \times T(°K) \times 14.7 \times n}{\text{mol. wt. of sample} \times \left( V - \frac{\text{wt. of sample}}{0.9} \right)}$$

where 82.06 is the gas constant in cc.-atm./mole-degree, 14.7 is p. s. i. per atmosphere, $n$ is the number of moles of hydrogen per mole of phenol which it is desired to add, V is the volume of the bomb and 0.9 is taken as the density of the sample.

After completion of the reaction the bomb is allowed to cool and its contents are removed and filtered to separate the catalyst from the hydrogenation product. The hydrogenation products may then be purified in any desired manner to separate them from the initial starting materials, such as by fractionation.

Because of the practical absence of side reactions, variations in operating conditions apparently have little influence on the character of the product when complete hydrogenation is desired; only the rate of reaction is altered.

It will be understood that the degree of hydrogenation is not destructive, i. e. the hydrogenation is not carried on to the extent that the OH group is reduced to give a hydrocarbon nor are the rings opened nor any groups removed.

It will be further understood that the temperature necessary to carry on a relatively mild hydrogenation is dependent upon the pressure and the higher the operating pressure the lower the temperature required to effect hydrogenation. The initial pressure is not as important as the pressure on the material when heated or the pressure at the end of the reaction. There must be sufficient hydrogen present at the end of the reaction to insure completion of the degree of hydrogenation desired, the final excess of hydrogen being indicated by the pressure of hydrogen present at that stage.

For complete hydrogenation, the reaction begins at about 160° C. and at a pressure of about 2200 pounds per square inch and was complete at a temperature of about 215° C. and at a pressure of about 2060 pounds per square inch. Yields obtained by our method approach the theoretical values.

When only partial hydrogenation or saturation of the polyalkyl phenol is desired, the operating conditions selected should be the mildest at which reaction will take place at an appreciable rate; for example, the reaction began at a temperature of about 160° C. and at a hydrogen pressure of about 2150 pounds per square inch and was complete at a temperature of about 185° C. and at a pressure of 2050 pounds per square inch. In the case of partial hydrogenation, the yields are somewhat lower than for complete hydrogenation due to the formation of some completely hydrogenated product.

The following specific examples will serve to illustrate and explain our invention:

*Example 1.*—This example relates to the preparation of 4,6-di-tertiary-butyl-2-methylcyclohexanol from 4,6-di-tertiary-butyl-2-methylphenol. Sixty parts of 4,6-di-tertiary-butyl-2-methylphenol, 6 parts of Raney nickel catalyst, and 1510 pounds per square inch of hydrogen were charged to a 1500 ml. rocking bomb. The bomb was electrically heated for a period of about two hours until a reaction temperature of about 185° C. and a pressure of about 2250 pounds per square inch of hydrogen were attained. The reaction was completed after the heating had been continued for a further period of about three and one-half hours, and when a temperature of about 220° C. and a final pressure of about 2100 pounds per square inch had been attained. Pressure drop was most rapid at a temperature of 200° C. and a pressure of about 2200 pounds per square inch. After cooling the bomb overnight, the contents thereof were discharged and filtered, and the hydrogenation product thus obtained, after rectification, had the following properties:

|  | B. P. | Per cent C | Per cent H |
|---|---|---|---|
| Calculated |  | 79.64 | 13.27 |
| Found | 142.4° C./20 mm. | 79.37 | 13.22 |

*Example 2.*—This example relates to the preparation of 4,6-di-tertiary-butyl-2-methylcyclohexanone from 4,6-di-tertiary-butyl-2-methylphenol. Sixty parts of 4,6-di-tertiary-butyl-2-methylphenol, 6 parts of Raney nickel catalyst, and 1490 pounds per square inch of hydrogen were charged to a rocking bomb. The bomb was heated for about one and one-half hours until it had reached a reaction temperature of about 160° C. and a pressure of about 2150 pounds per square inch of hydrogen. The heating was continued for a further period of about one hour and forty minutes after which the pressure drop corresponded to the addition of 2 mols of hydrogen. At this point, the temperature was 183° C. and the pressure was 2020 pounds per square inch of hydrogen. After completion of the reaction, the bomb was allowed to cool overnight, the contents thereof were discharged and filtered, and the product, after rectification, had the following properties:

|  | B. P. | Per cent C | Per cent H | Sp. Gr. 60/60 | $n_D^{20}$ |
|---|---|---|---|---|---|
| Found | 139–40.5° C./20 mm. | 79.95 | 12.66 | 0.8961 | 1.4640 |
| Calculated |  | 80.36 | 12.50 |  |  |

In the above example "Sp. Gr. 60/60" refers to the specific gravity of the compound at 60° F. as compared to water at 60° F. and $n_D^{20}$ refers to the refractive index at 20° C., using the D line of sodium as the source of light.

The compounds of the present invention are adapted to be employed as chemical intermediates in the manufacture of pharmaceuticals, plasticizers, detergents, and as antioxidants. The compounds are particularly useful as plasticizers for casein, melamine, ethyl cellulose and cellulose nitrate plastics where clarity and light stability are desirable features. Specifically, 4,6-di-tertiary-butyl-2-methylcyclohexanone is useful as a substitute for camphor in the plasticization of cellulose nitrate.

In general, the compounds of this invention may be represented by the following formula:

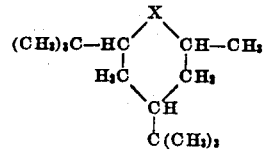

wherein X represents a radical selected from the group consisting of CHOH and CO.

Thus we have described the new and useful compositions of matter, 4,6-di-tertiary-butyl-2-methylcyclohexanol and 4,6-di-tertiary-butyl-2-methylcyclohexanone, and methods for their preparation.

The compound 4,6-di-tertiary-butyl-2-methylcyclohexanol and a process for making it are disclosed and claimed in our copending divisional application, Serial No. 78,224, filed February 24, 1949.

What we claim is:

1. As a new product, the compound 4,6-di-tertiary-butyl-2-methylcyclohexanone.

2. A method of converting 4,6-di-tertiary-butyl-2-methylphenol into 4,6-di-tertiary-butyl-2-methylcyclohexanone which comprises subjecting 4,6-di-tertiary-butyl-2-methylphenol, in the presence of a nickel catalyst, to a temperature of about 160° C. and a pressure of about 2150 pounds per square inch of hydrogen, while heating and agitating the reactants, and continuing said hydrogenation to partially saturate said phenol thereby converting it into 4,6-di-tertiary-butyl-2-methylcyclohexanone.

ARTHUR C. WHITAKER.
WILLIAM W. WEINRICH.

REFERENCES CITED

The following references are of record in the file of this patent:

UNITED STATES PATENTS

| Number | Name | Date |
|---|---|---|
| 1,972,599 | Perkins et al. | Sept. 4, 1934 |
| 2,087,691 | Lazier | July 20, 1937 |

OTHER REFERENCES

Beilstein "Handbuch der organischen Chemie," vol. VI Supplement page 32, vol. VII Supplement page 40.